(12) United States Patent
Lo et al.

(10) Patent No.: US 12,307,048 B2
(45) Date of Patent: May 20, 2025

(54) ELECTRONIC DEVICE

(71) Applicant: InnoLux Corporation, Miao-Li County (TW)

(72) Inventors: Huan-Liang Lo, Miao-Li County (TW); Jui-Tai Feng, Miao-Li County (TW); Yu-Hong Chen, Miao-Li County (TW); Shang-Ming Yen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 25 days.

(21) Appl. No.: 18/181,846

(22) Filed: Mar. 10, 2023

(65) Prior Publication Data

US 2023/0325032 A1    Oct. 12, 2023

Related U.S. Application Data

(60) Provisional application No. 63/328,319, filed on Apr. 7, 2022.

(30) Foreign Application Priority Data

Dec. 27, 2022    (CN) .......................... 202211688241.0

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
CPC .. G09G 3/20; G09G 3/32; G09G 3/34; G09G 3/36; G09G 3/3208; G09G 3/3225; G09G 5/10; G06F 3/038; G06F 3/041; G06F 3/044; G06F 3/046; G06F 3/047; G02F 1/1333; G02F 1/1362
USPC .................................................. 345/156, 204
See application file for complete search history.

(56) References Cited

U.S. PATENT DOCUMENTS

| | | | |
|---|---|---|---|
| 10,126,851 B2 | 11/2018 | Yeh et al. | |
| 2006/0139250 A1* | 6/2006 | Sarrasin | G09G 3/22 345/75.2 |
| 2012/0206427 A1* | 8/2012 | Yamamuro | G03B 21/2053 345/207 |
| 2013/0069560 A1* | 3/2013 | Kurita | H05B 47/10 315/294 |
| 2017/0032728 A1* | 2/2017 | Shima | G06F 3/0412 |
| 2017/0308212 A1* | 10/2017 | Jin | H10K 59/131 |
| 2018/0074644 A1 | 3/2018 | Ichihara | |
| 2018/0151593 A1* | 5/2018 | Inoue | G09G 3/3677 |
| 2019/0025620 A1* | 1/2019 | Tuan | G02F 1/13452 |

(Continued)

FOREIGN PATENT DOCUMENTS

| | | |
|---|---|---|
| CN | 105630243 A | 6/2016 |
| CN | 107807749 A | 3/2018 |

*Primary Examiner* — Chanh D Nguyen
*Assistant Examiner* — Nguyen H Truong
(74) *Attorney, Agent, or Firm* — McClure, Qualey & Rodack, LLP

(57) ABSTRACT

An electronic device includes a touch-sensing unit and a light source. The light source is disposed adjacent to the touch-sensing unit. The driving signal of the light source has a voltage change period. The touch-sensing unit performs a sensing operation in a sensing period. The voltage change period and the sensing period at least partially overlap.

18 Claims, 3 Drawing Sheets

(56) References Cited

U.S. PATENT DOCUMENTS

| | | | | |
|---|---|---|---|---|
| 2019/0339805 | A1* | 11/2019 | Suzuki | G06F 3/0447 |
| 2020/0150811 | A1* | 5/2020 | Shepelev | G06F 3/044 |
| 2020/0312234 | A1* | 10/2020 | Lin | G06F 3/0412 |
| 2020/0326815 | A1* | 10/2020 | Choi | G06F 3/04184 |
| 2021/0110132 | A1* | 4/2021 | Cho | G06F 1/1626 |
| 2021/0318773 | A1* | 10/2021 | Kim | G09G 3/3233 |
| 2021/0365142 | A1* | 11/2021 | Nitobe | G06F 3/0446 |
| 2021/0397327 | A1* | 12/2021 | Lee | G06F 3/0412 |
| 2022/0067340 | A1* | 3/2022 | Han | G06V 40/1365 |
| 2022/0171517 | A1* | 6/2022 | Oh | G06F 3/0446 |
| 2022/0308410 | A1* | 9/2022 | Hou | G02F 1/133512 |
| 2022/0404946 | A1* | 12/2022 | Lee | G06F 3/04166 |
| 2023/0037637 | A1* | 2/2023 | Kim | G06F 3/0412 |
| 2023/0050409 | A1* | 2/2023 | Lee | G09G 3/20 |
| 2023/0125764 | A1* | 4/2023 | Kim | G06F 3/04162 345/173 |
| 2023/0196982 | A1* | 6/2023 | Lee | G09G 3/3233 345/204 |
| 2023/0205366 | A1* | 6/2023 | Ye | H10K 59/40 345/174 |
| 2023/0419880 | A1* | 12/2023 | Li | G09G 3/2081 |
| 2024/0152235 | A1* | 5/2024 | Weng | G06F 3/04184 |
| 2024/0371318 | A1* | 11/2024 | Kim | G09G 3/36 |

\* cited by examiner

ELECTRONIC DEVICE

CROSS REFERENCE TO RELATED APPLICATIONS

This application claims priority of U.S. Provisional Application No. 63/328,319, filed Apr. 7, 2022, and China Patent Application No. 202211688241.0, filed on Dec. 27, 2022, the entirety of which is incorporated by reference herein.

BACKGROUND OF THE DISCLOSURE

Field of the Disclosure

The disclosure relates to an electronic device, and in particular, to an electronic device for reducing the coupling interference energy.

Description of the Related Art

Conventional electronic devices may include a touch sensor and a light source, disposed adjacent to each other. However, the pulse of the driving signal that is used to drive the light source may generate instantaneous coupling energy, which can interfere with the normal operation of the touch sensor. This can have a negative effect on the sensing performance of the touch sensor. Therefore, a new design for a circuit structure is needed to solve the problem described above.

BRIEF SUMMARY OF THE DISCLOSURE

An embodiment of the disclosure provides an electronic device, which includes a touch-sensing unit and a light source. The light source is disposed adjacent to the touch-sensing unit. The driving signal of the light source has a voltage change period. The touch-sensing unit performs a sensing operation in a sensing period. The voltage change period and the sensing period at least partially overlap.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
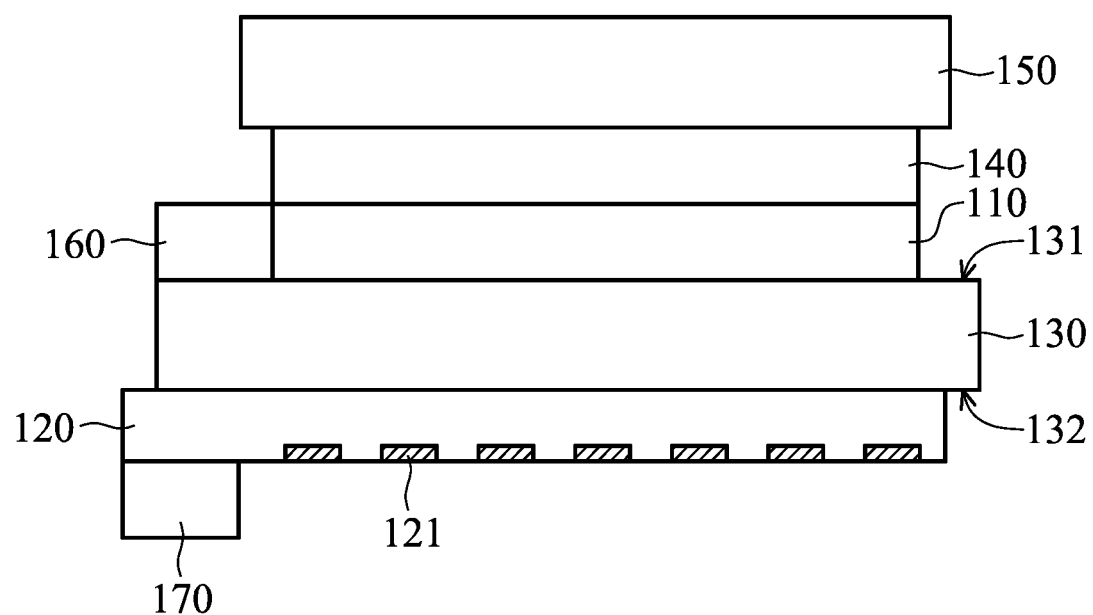
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term "coupled" may include any direct and indirect means of electrical connection.

In the text, the terms "substantially" or "approximately" usually means within 20%, or within 10%, or within 5%, or within 3%, or within 2%, or within 1%, or within 0.5% of a given value or range. The quantity given here is an approximate quantity. That is, without the specific description of "substantially" or "approximately", the meaning of "substantially" or "approximately" may still be implied.

The "including" mentioned in the entire specification and claims is an open term, so it should be interpreted as "including or comprising but not limited to".

Furthermore, "connected or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. Please refer to FIG. 1. The electronic device 100 may at least include a touch-sensing unit 110 and a light source 120.

The touch-sensing unit 110 may include at least one touch sensor, but the disclosure is not limited thereto. The touch-sensing unit 110 may sense a touch operation and generate a corresponding touch signal.

The light source 120 may be disposed adjacent to the touch-sensing unit 110. In the embodiment, the light source 120 may be a backlight module, and the light source 120 may include at least one light-emitting diode 121, but the disclosure is not limited thereto. In addition, the above light-emitting diode 121 is, for example, an OLED, a mini LED, a micro LED, a QLED, or a combination thereof, but the disclosure is not limited thereto.

In the embodiment, the electronic device 100 may further include a first substrate 130, a display unit 140, a second substrate 150, a first driving device 160 and a second driving device 170. The first substrate 130 may be disposed between the touch-sensing unit 110 and the light source 120. Furthermore, the touch-sensing unit 110 may be disposed on a first side 131 of the first substrate 130, and the light source 120 may be disposed adjacent to a second side 132 of the first substrate 130, wherein the first side 131 may be opposite to the second side 132. The electronic device 100 may include a liquid crystal display (LCD) panel, but the disclosure is not limited thereto.

As shown in FIG. 1, the display unit 140 may be disposed on the touch-sensing unit 110, but the disclosure is not limited thereto. In some embodiments, the display unit 140 may be disposed adjacent to the touch-sensing unit 110. More specifically, when it is mentioned that "the display unit 140 is disposed adjacent to the touch-sensing unit 110", it indicates that the display unit 140 may include components, such as a transistor, a data signal line, a scanning signal line, a pixel electrode, etc., and the transistor may be coupled to the data signal line, the scanning signal and the pixel electrode. The touch-sensing unit 110 may include components, such as a touch sensing electrode, a signal reading line, etc., and the touch sensing electrode may be coupled to the signal reading line. At the same time, some components of the display unit 140 and some components of the touch-sensing unit 110 may be adjacently disposed, and appear side by side or at least partially overlap in a top view. The second substrate 150 may be disposed on the display panel 140 and the touch-sensing unit 110. In the embodiment, the first substrate 130 and/or the second substrate 150 may be a glass substrate, but the disclosure is not limited thereto. In some embodiments, the first substrate 130 may also be a flexible substrate material, and the second substrate 150 may also be a flexible substrate material or a thin film layer covering the display unit 140 and the touch-sensing unit 110.

Furthermore, the touch-sensing unit 110 and the display unit 140 may be disposed between the second substrate 150 and the first substrate 130.

The first driving device 160 may be disposed on the first side 131 of the first substrate 130. The first driving device 160 may be electrically connected to the display unit 140 and/or the touch-sensing unit 110, so as to drive the display unit 140 and/or the touch-sensing unit 110.

The second driving device 170 may be disposed on, but not limited to, a side of the light source 120 opposite to the second side 131 of the first substrate. The second driving device 170 may be electrically connected to the light source 120, so as to drive the light source 120. That is, the second driving device 170 may generate the driving signal to the light source 120, so that the light source 120 may generate a corresponding light.

The above embodiment has described the internal components of the electronic device 100 and the disposing relationship thereof, and some embodiments will be described below to illustrate the driving signal for driving the light source.

Figure 2:
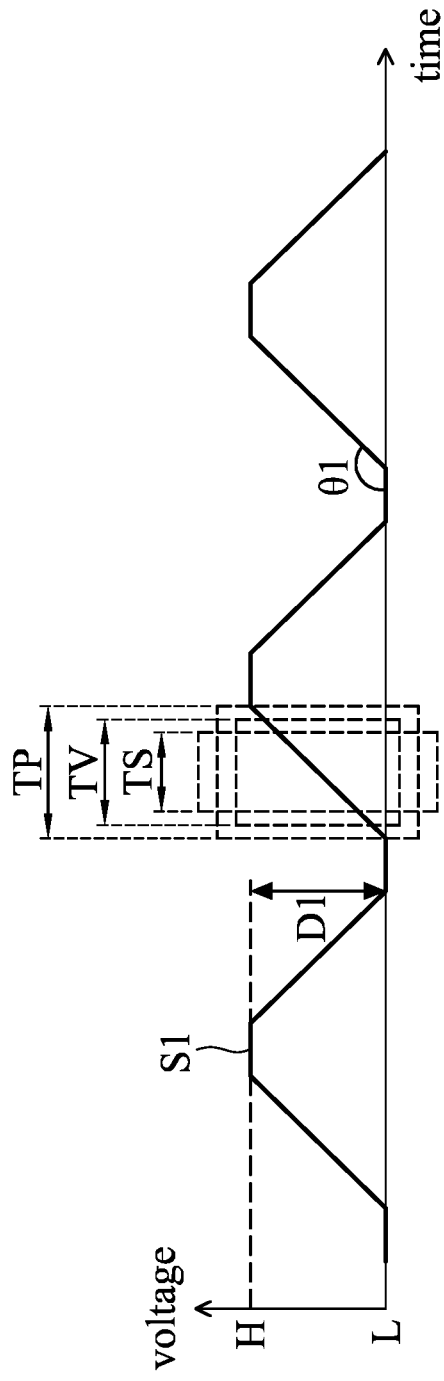
FIG. 2 is a waveform diagram of a driving signal according to an embodiment of the disclosure.

FIG. 2 is a waveform diagram of a driving signal according to an embodiment of the disclosure. Please refer to FIG. 1 and FIG. 2. The driving signal S1 (i.e., the driving signal generated by the second driving device 170) of the light source 120 may have a voltage change period TP. In the embodiment, the voltage change period TP is, for example, the period during which the driving signal S1 changes from the lowest voltage value L to the highest voltage value H, or the period during which the driving signal S1 changes from the highest voltage value H to the lowest voltage value L. Furthermore, the above driving signal S1 is, for example, a pulse width modulation (PWM) signal, but the disclosure is not limited thereto.

The touch-sensing unit 110 may perform a sensing operation in a sensing period TS, and the at least one voltage change period TP and the sensing period TS may at least partially overlap. That is, the touch-sensing unit 110 may perform the sensing operation during part of the voltage change period TP.

In some embodiments, the length of the voltage change period TP may be greater than or equal to 200 nanoseconds (ns) and less than or equal to 20000 ns (200 ns≤TP≤20000 ns), but the disclosure is not limited thereto. In some embodiments, the length of the sensing period TS may be greater than or equal to 5000 ns and less than or equal to 3000000 ns (5000 ns≤TP≤3000000 ns), but the disclosure is not limited thereto. In addition, in the embodiment, the length of the voltage change period TP may be, for example, longer than the length of the sensing period TS.

In some embodiment, the driving signal S1 also has a light source switching period TV. The length of the light source switching period TV may be between the length of the voltage change period TP and the length of the sensing period TS, and it may cover the voltage change period TP or the sensing period TS: whichever one is shorter. For example, in the embodiment, the light source switching period TV convers the sensing period TS. More specifically, the start point of the light source switching period TV may be located at the midpoint between the start point of the voltage change period TP and the start point of the sensing period TS, and the end point of the light source switching period TV may be located at the midpoint between the end point of the voltage change period TP and the end point of the sensing period TS. Since the highest voltage value H of the light source 120 is related to the number of the light-emitting diodes 121 connected in series, the voltage change speed of the light source switching period may change with the number of the light-emitting diodes 121 connected in series. For example, if two light-emitting diodes 121 with a maximum voltage of 2.8 volts (V) are connected in series, the highest voltage value required to drive the light source 120 is 5.6 volts. In order to reduce the interference of the pulse of the driving signal S1 on the touch-sensing unit 110 when driving the light source, the voltage average change speed may be reduced in the embodiment. For example, in the light source switching period TV, the voltage average change speed of the driving signal S1 may be greater than 0 and less than 0.028 (volts/nanoseconds) (i.e., 5.6 V divided by 200 ns), but the disclosure is not limited thereto. In the embodiment, since the light source switching period TV is within the voltage change period TP, the voltage change speed of the driving signal S1 in the voltage change period TP is the same as the voltage average change speed of the light source switching period TV.

Furthermore, in the embodiment, since the voltage change speed in the voltage change period TP is the same as the voltage average change speed of the light source switching period TV, the voltage average change speed of the light source switching period TV may be equal to the voltage-change quantity D1 of the driving signal S1 (a voltage difference between the highest voltage value H and the lowest voltage value L of the driving signal S1) divided by the length the voltage change period TP (i.e., the voltage average change speed=D1/TP). In addition, in the embodiment, the highest voltage value is, for example, 5.6 volts (V), and the lowest voltage value is, for example, 0V, but the disclosure is not limited thereto.

In some embodiments, the waveform of the driving signal S1 at the position where the voltage value starts to rise has an included angle θ1. In addition, the above included angle θ1 may be greater than 90 degrees and less than or equal to 150 degrees (i.e., 90 degrees≤θ1≤150 degrees), but the disclosure is not limited thereto. In the embodiment, the above included angle θ1 may be 140 degrees.

Figure 3:
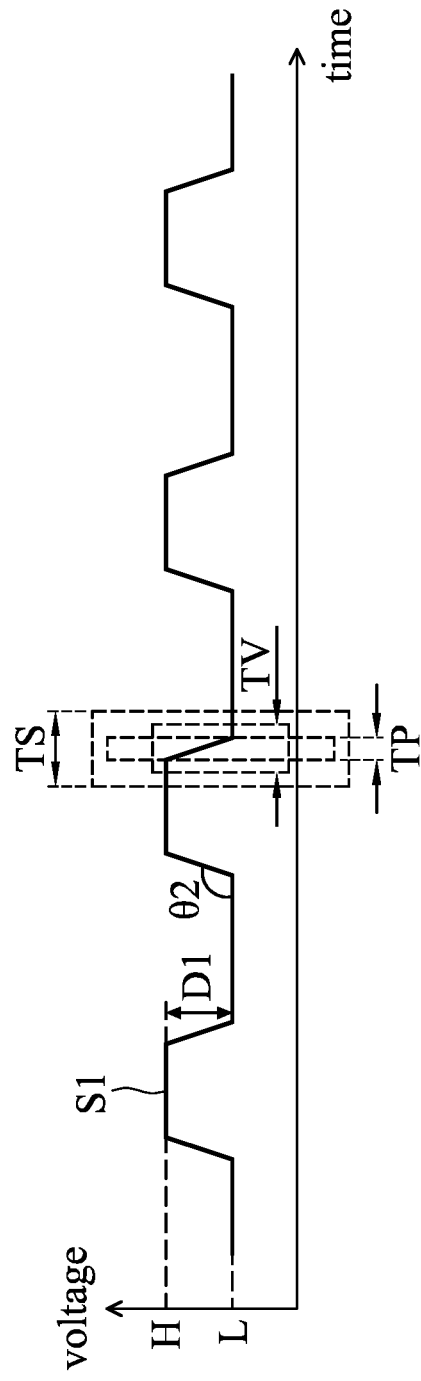
FIG. 3 is a waveform diagram of a driving signal according to another embodiment of the disclosure.

FIG. 3 is a waveform diagram of a driving signal according to another embodiment of the disclosure. Please refer to FIG. 1 and FIG. 3. The driving signal S1 (i.e., the driving signal generated by the second driving device 170) may have a voltage change period TP. In the embodiment, the voltage change period TP is, for example, the period during which the driving signal S1 changes from the highest voltage value H to the lowest voltage value L, but the disclosure is not limited thereto. In addition, the voltage change period TP may also be the period during which the driving signal S1 changes from the lowest voltage value L to the highest voltage value H. Furthermore, the above driving signal S1 is, for example, the pulse width modulation signal, but the disclosure is not limited thereto.

The touch-sensing unit 110 may perform a sensing operation in a sensing period TS, and the voltage change period TP and the sensing period TS may at least partially overlap. That is, the touch-sensing unit 110 may perform the sensing operation during part of the voltage change period TP.

The difference between the embodiment and the embodiment shown in FIG. 2 is that the length of the voltage change period TP is, for example, less than the length of the sensing period TS, and the light source switching period TV covers the voltage change period TP. In addition, in the embodiment, the lowest voltage value L of the driving signal S1 is also increased, so as to reduce the voltage-change quantity D1 of the driving signal. In the embodiment, the lowest voltage value L may be higher than 0 volts and lower than a voltage value at which the light-emitting diode 121 in the light source 120 starts to emit light. For example, when the light-emitting diode 121 starts to emit light from a voltage of 2 volts and the two light-emitting diodes 121 in the light source 120 are connected in series, the lowest voltage value L of the driving signal S1 should be higher than 0 volts and lower than 4 volts (equal to 2 volts multiplied by 2).

With the different types of the light-emitting diodes 121 and the number of light-emitting diodes 121 connected in series, the highest voltage value H and the lowest voltage value L of the driving signal S1 may also be different. In the embodiment, the voltage-change quantity D1 of the driving signal S1 may be 10%~90% of the highest voltage value H of the driving signal S1, but the disclosure is not limited thereto. That is, in the embodiment, by increasing the lowest voltage value L of the driving signal S1, the voltage-change quantity D1 is reduced, and the interference of the pulse of the driving signal S1 on the touch-sensing unit 110 is further reduced.

In the light source switching period TV, the voltage average change speed may be equal to the voltage-change quantity D1 of the driving signal S1 divided by the length of the light source switching period TV (i.e., the voltage average change speed=D1/TV). Since the voltage-change quantity D1 decreases, and the light source switching period TV is longer than the voltage change period TP, the voltage average change speed also decreases accordingly. At the same time, the voltage average change speed of the light source switching period TV is smaller than the voltage change speed within voltage change period TP.

In some embodiments, there is an included angle θ2 between the lowest voltage value L of the driving signal S1 and the driving signal S1 of the voltage change period TP. In addition, the above included angle θ2 may be greater than 90 degrees and less than or equal to 150 degrees (i.e., 90 degrees <θ≤150 degrees), but the disclosure is not limited thereto. In the embodiment, the above included angle θ2 may be 110 degrees. In the embodiment, although the voltage change speed within the voltage change period TP may be faster than the voltage change speed in the embodiment shown in FIG. 2, the embodiment may still reduce the interference of the pulse of the driving signal S1 on the touch-sensing unit 110 due to the reduction of the voltage-change quantity D1.

Figure 4:
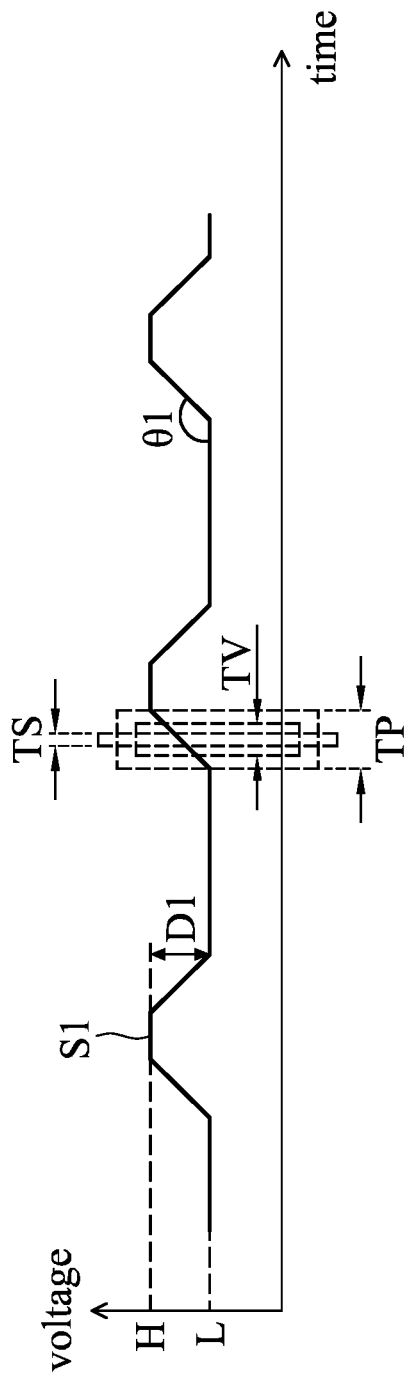
FIG. 4 is a waveform diagram of a driving signal according to another embodiment of the disclosure.

FIG. 4 is a waveform diagram of a driving signal according to another embodiment of the disclosure. The driving signal S1 in FIG. 4 is substantially combined by the driving signal S1 in the embodiment in FIG. 2 and the embodiment in FIG. 3. That is, in FIG. 4, the voltage change speed of the voltage change period TP in reduced at the same time, and the voltage-change quantity D1 of the driving signal S1 is also reduced. Therefore, the embodiment may refer to the related descriptions in FIG. 2 and FIG. 3, and the description thereof is not repeated herein.

Figure 5:
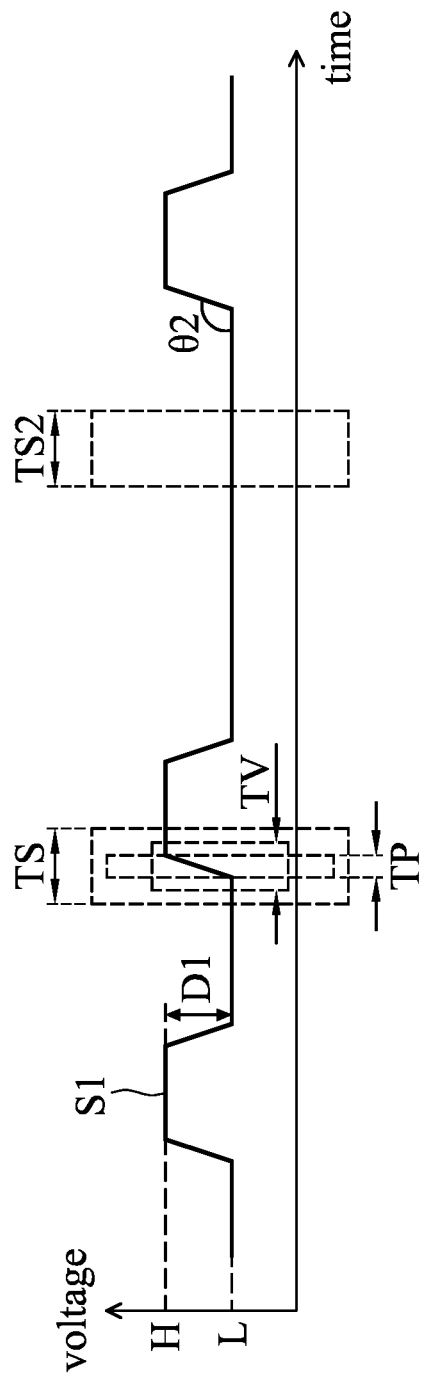
FIG. 5 is a waveform diagram of a driving signal according to another embodiment of the disclosure.

FIG. 5 is a waveform diagram of a driving signal according to another embodiment of the disclosure. Since the embodiment in FIG. 5 is substantially similar to the embodiment shown in FIG. 3, the similarities between the two may not be repeated herein. The difference between the embodiment and the embodiment shown in FIG. 3 is that the touch-sensing unit 110 may perform an sensing operation during another sensing period TS2, and during this sensing period TS2, there may be no voltage change in the driving signal S1. For example, the driving signal S1 is at the lowest voltage value L or the voltage-change quantity D1 is zero. Specifically, the sensing period TS2 may be located between the second pulse and the third pulse. Therefore, the touch-sensing unit 110 may perform the sensing operation during the sensing period TS (i.e., the operation may overlap the voltage change period TP) and/or the sensing period TS2 (i.e., the period during which there is no voltage change in the driving signal S1), so as to increase the convenience of use.

In FIG. 5, the position of the sensing period TS2 is an exemplary embodiment of the disclosure, but the disclosure is not limited thereto. Since the frequency of the signal for driving the touch-sensing unit 110 may not be equal to the frequency of the driving signal S1 for driving the light source 120, a part of the sensing period TS2 may be located between two adjacent pulses of the driving signal S1. The sensing period TS2 shown in FIG. 5 is located between the second pulse and the third pulse, and in some embodiments, the sensing period TS2 may also be located between the first pulse and the second pulse. In some other embodiments, the driving signal S1 of the light source 120 may be changed according to the requirements (for example, the light source 120 may have a frequency conversion light-emitting function), so the time interval between the second pulse and the third pulse may be greater than the time interval between the first pulse and the second pulse. Accordingly, the sensing period TS2 is located between the second pulse and the third pulse.

In summary, according to the electronic device disclosed by the embodiments of the disclosure, the driving signal of the light source has the voltage change period, the touch-sensing unit performs the sensing operation during the sensing period, and the voltage change period and the sensing period at least partially overlap. In addition, in the light source switching period of the driving signal (the length of the light source switching period is between the length of the voltage change period and the length of the sensing period), and the voltage average change speed of the driving signal is greater than 0 and less than 0.028 (V/ns). Furthermore, the voltage-change quantity of the driving signal is 10%~90% of the highest voltage value of the driving signal. Moreover, there is the included angle between the lowest voltage value of the driving signal and the driving signal in the voltage change period, and the included angle is greater than 90 degrees and less than or equal to 150 degrees. Therefore, by changing the waveform of the driving signal, the coupling interference energy of the driving signal on the touch-sensing unit may be reduced, or the impact on the sensing performance of the touch-sensing unit may be reduced.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. An electronic device, comprising:
a touch-sensing unit; and
a light source, disposed adjacent to the touch-sensing unit;
wherein a light source driving signal of the light source has a voltage change period and a light source switching period, the touch-sensing unit performs a sensing operation in a sensing period, and the voltage change period and the sensing period at least partially overlap;
wherein a length of the voltage change period is longer than a length of the sensing period;
wherein a start point of the light source switching period is located at a midpoint between a start point of the voltage change period and a start point of the sensing period, an end point of the light source switching period is located at a midpoint between an end point of the voltage change period and an end point of the sensing period.

2. The electronic device as claimed in claim 1, wherein the light source driving signal is a pulse width modulation signal.

3. The electronic device as claimed in claim 1, wherein a length of the voltage change period is greater than or equal to 200 nanoseconds and less than or equal to 20000 nanoseconds.

4. The electronic device as claimed in claim 1, wherein a length of the sensing period is greater than or equal to 5000 nanoseconds and less than or equal to 3000000 nanoseconds.

5. The electronic device as claimed in claim 1, wherein a length of the light source switching period is between a length of the voltage change period and a length of the sensing period.

6. The electronic device as claimed in claim 1, wherein the light source switching period covers a shorter of the voltage change period and the sensing period.

7. The electronic device as claimed in claim 1, wherein in the light source switching period, a voltage average change speed of the light source driving signal is greater than 0 and less than 0.028 (volts/nanoseconds).

8. The electronic device as claimed in claim 1, wherein a voltage-change quantity of the light source driving signal is a distance between a highest voltage value and a lowest voltage value of the light source driving signal.

9. The electronic device as claimed in claim 8, wherein the voltage-change quantity is 10%~ 90% of the highest voltage value.

10. The electronic device as claimed in claim 1, wherein the touch-sensing unit performs the sensing operation in another sensing period, and in the another sensing period, there is no voltage change in the light source driving signal.

11. The electronic device as claimed in claim 1, wherein a waveform of the light source driving signal at a position where a voltage value starts to rise has an included angle.

12. The electronic device as claimed in claim 11, wherein the included angle is greater than 90 degrees and less than or equal 150 degrees.

13. The electronic device as claimed in claim 1, wherein a frequency of the light source driving signal is different from a frequency of a signal for driving the touch-sensing unit.

14. The electronic device as claimed in claim 1, further comprising a first substrate, wherein the touch-sensing unit is disposed on the first substrate, and the first substrate is located between the touch-sensing unit and the light source.

15. The electronic device as claimed in claim 14, further comprising a display unit, wherein the display unit is disposed on the touch-sensing unit.

16. The electronic device as claimed in claim 15, further comprising a first driving device, wherein the first driving device is disposed on the first substrate, and the first driving device is electrically connected to the display unit and/or the touch-sensing unit.

17. The electronic device as claimed in claim 15, further comprising a second substrate, wherein the second substrate is disposed on the display unit and the touch-sensing unit, and the display unit and the touch-sensing unit are located between the first substrate and the second substrate.

18. The electronic device as claimed in claim 1, further comprising a second driving device, wherein the second driving device is disposed on the light source, and the second driving device is electrically connected to the light source.

\* \* \* \* \*